(12) United States Patent
Djordjevic

(10) Patent No.: US 12,010,223 B2
(45) Date of Patent: Jun. 11, 2024

(54) JOINT TWIN-FIELD QUANTUM KEY DISTRIBUTION CRYPTOSYSTEM

(71) Applicant: Arizona Board of Regents on Behalf of the University of Arizona, Tucson, AZ (US)

(72) Inventor: Ivan Djordjevic, Tucson, AZ (US)

(73) Assignee: ARIZONA BOARD OF REGENTS ON BEHALF OF THE UNIVERSITY OF ARIZONA, Tucson, AZ (US)

(*) Notice: Subject to any disclaimer, the term of this patent is extended or adjusted under 35 U.S.C. 154(b) by 389 days.

(21) Appl. No.: 17/373,445

(22) Filed: Jul. 12, 2021

(65) Prior Publication Data

US 2022/0014362 A1 Jan. 13, 2022

Related U.S. Application Data

(60) Provisional application No. 63/051,020, filed on Jul. 13, 2020.

(51) Int. Cl.
| | |
|---|---|
| H04L 9/08 | (2006.01) |
| H03M 13/00 | (2006.01) |
| H03M 13/11 | (2006.01) |
| H04B 10/40 | (2013.01) |
| H04B 10/70 | (2013.01) |
| H04L 1/00 | (2006.01) |

(52) U.S. Cl.
CPC ........... H04L 9/0852 (2013.01); H04B 10/40 (2013.01); H04L 1/0061 (2013.01)

(58) Field of Classification Search
CPC ..... H04L 9/0852; H04L 1/0061; H04L 1/004; H04B 10/40; H04B 10/70; H03M 13/116; H03M 13/63
See application file for complete search history.

(56) References Cited

U.S. PATENT DOCUMENTS

| | | | | |
|---|---|---|---|---|
| 2004/0190719 A1* | 9/2004 | Lo | ......................... | H04L 9/0858 380/255 |
| 2007/0058810 A1* | 3/2007 | Tanaka | ................... | H04L 9/0852 380/210 |
| 2007/0230688 A1* | 10/2007 | Tajima | ................... | H04L 9/0891 380/30 |
| 2013/0315395 A1* | 11/2013 | Jacobs | ................... | H04L 9/0852 380/278 |
| 2015/0193306 A1* | 7/2015 | Doi | ....................... | H04L 9/0858 714/746 |

(Continued)

OTHER PUBLICATIONS

Entanglement-assisted quantum low-density parity-check codes, by Clark et al. published 2010 (Year: 2010).*

(Continued)

*Primary Examiner* — Vu V Tran
(74) *Attorney, Agent, or Firm* — Grossman, Tucker, Perreault & Pfleger, PLLC

(57) ABSTRACT

The present disclosure is directed to systems and methods of providing a secure quantum key distribution cryptosystem in which the quantum key data is exchanged between Alice and Bob using a quantum channel and the parity bits associated with the quantum key data are encrypted using a post-quantum computing (PQC) encryption method and communicated between Alice and Bob using a public channel.

15 Claims, 5 Drawing Sheets

(56) References Cited

U.S. PATENT DOCUMENTS

2017/0264433 A1* 9/2017 Tanizawa .............. H04L 9/0858
2021/0266157 A1* 8/2021 Hong .................... H04L 9/0852
2023/0254132 A1* 8/2023 Ramanathan .......... H04L 9/008
                                                         380/28

OTHER PUBLICATIONS

Entanglement-assisted quantum low-density parity-check codes, by Gruner et al., published 2015 (Year: 2015).*
Djordjevic, "Joint Twin-Field-QKD-McEliece Cryptosystem", University of Arizona, Advanced Photonics Congress 2020, Tucson, AZ, Jul. 2020, pp. 1-13.
Djordjevic, "Joint Twin-Field-QKD-McEliece Cryptosystem", University of Arizona, Tucson, AZ, Apr. 5, 2020.

* cited by examiner

JOINT TWIN-FIELD QUANTUM KEY DISTRIBUTION CRYPTOSYSTEM

TECHNICAL FIELD

The present disclosure relates to joint quantum key distribution (QKD)—post-quantum cryptosystems (PQC).

BACKGROUND

Quantum communication (QuCom) employs the quantum information theory concepts to realize the distribution of keys with verifiable security, commonly referred to as quantum key distribution (QKD), where security is ensured by fundamental laws of physics as opposed to unproven mathematical assumptions employed in computational security-based cryptography. Despite the appealing features of QuCom, there are some fundamental and technical challenges to the adoption and widespread application of QuCom. For instance, the rate and distance of QuCom are fundamentally limited by the channel loss, which is specified by the rate-loss tradeoff. To overcome the rate-distance limit of discrete variable QKD (DV-QKD) protocols, two approaches have been pursued recently: (i) development of quantum relays and (ii) the employment of the trusted relays. Unfortunately, the quantum relays require the use of long-duration quantum memories and high-fidelity entanglement distillation, which are still out of reach with current technology. On the other hand, the trusted-relay methodology assumes that the relay between two users can be trusted; unfortunately, this assumption is difficult to verify in practice. The measurement device independent QKD (MDI-QKD) approach, was able to close the detection loopholes and extend the transmission distance; however, its secret-key rate (SKR) is still bounded by O(T)-dependence of the upper limit (with T being transmissivity). Recently, the twin-field QKD (TF-QKD) was proposed to overcome the rate-distance limit. It has been demonstrated that TF-QKD upper limit scales with the square-root of transmittance, that is r~O($\sqrt{T}$), which represents a promising approach to extend the transmission distance. However, given that TF-QKD, similar to MDI-QKD, relies on partial Bell state measurements by Charlie (Eve), the Bell states $|\varphi^\pm\rangle = 2^{-1/2}(|00\rangle + |11\rangle)$ cannot be distinguished resulting in low secret key rates (SKRs) at extended distances.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
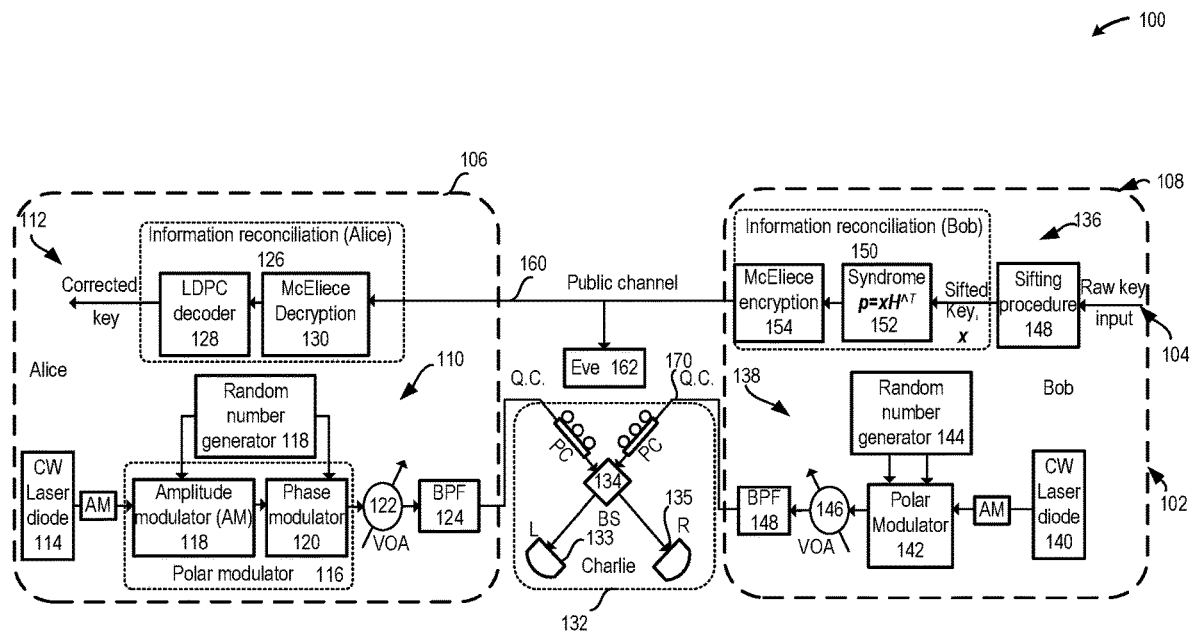
FIG. 1 illustrates a joint quantum key distribution (QKD)-post-quantum cryptography (PQC) system according to several embodiments of the present disclosures.

Although the following Detailed Description will proceed with reference being made to illustrative embodiments, many alternatives, modifications and variations thereof will be apparent to those skilled in the art.

DETAILED DESCRIPTION

The systems and methods disclosed herein overcome these key challenges for DV-QKD. To increase the generation rate of the secret key and to extend the transmission distance, the teachings of the present disclosure provide systems and methods to limit information revealed during the error reconciliation phase by transmitting the parity bits after encrypting the parity bits using the post-quantum cryptography (PQC) algorithms. Alternatively, the PQC can be replaced by any private cryptographic scheme. The PQC is typically referred to various cryptographic algorithms that are thought to be secure against any quantum computer-based attack. Unfortunately, the PQC is also based on unproven assumptions and some of the PQC algorithms might be bro ken in the future by developing more sophisticated quantum algorithms. For instance lattice-based cryptography algorithms often rely on so called collision resistance hash functions, such as u=Ax, where x is Alice private vector and u is the public vector, with A being m×n public matrix with columns representing the lattice basis vectors. To determine the Alice's private vector x Eve will need to do matrix inversion to get x=$A^{-1}$u. By using the quantum computer designed to perform a Harrow-Hassidim-Lloyd (HHL)-like algorithm, Eve can get an exponential speed-up compared to a corresponding classical algorithm, and the security of lattice-based cryptography cannot be guaranteed. Accordingly, the present disclosure uses a PQC algorithms only in information reconciliation phase to limit the leakage due to transmission of parity bits over an authenticated classical channel (in conventional QKD). Even though the best quantum algorithms can provide an exponential speed-up over corresponding classical algorithms, the complexity of quantum algorithms cannot be ignored, and such complexity can be generally expressed in terms of number of quantum gates required. Thus, the number of security bits is proportional to the $\log_2(L)$, where L is the number of operations needed for an attack to be successful. If and when a quantum algorithm is used to attack a given PQC protocol, the number of security bits equal to $\log_2(L)$ is typically not sufficient for perfect security algorithms, such as one-time pad. However, when an (N, K) LDPC code of high rate is used in information reconciliation, with the number of parity bits N−K<<n (where n is the codeword length used in a PQC protocol), the QPC security is sufficient to eliminate the leakage during the error correction stage. In conventional QKD, it is commonly assumed that Eve is an all-powerful eavesdropper and the complexity of quantum algorithms used to break the classical cryptography algorithms is ignored. Unfortunately, this omnipotent assumption is often too restrictive and not realistic in practical applications. The joint QKD-cryptosystem of the present disclosure belongs to the class of realistic cryptography schemes when Eve is not omnipotent in the sense that it assumes that algorithms used to break the protocols have complexity that cannot be ignored. Moreover, the joint QKD-PQC of the present disclosure exploits the complexity of corresponding quantum algorithms. The systems and methods disclosed herein beneficially make us of the PQC algorithms only for information reconciliation to limit the leakage due to transmission of parity bits (in conventional QKD).

FIG. 1 illustrates a joint quantum key distribution (QKD)-post-quantum cryptography (PQC) system 100 according to several embodiments of the present disclosure. The system 100 of FIG. 1 generally includes a quantum domain 102 generally configured to provide quantum-based communication between Alice 106 and Bob 108 over a quantum channel 170, and a public domain 104 generally configured to provide non-quantum (i.e., conventional public channel) communication between Alice 106 and Bob 108 over a conventional public channel 160. A conventional public channel 160 may include, for example any conventional or after-developed communications techniques such as internet communications, WiFi communications, wireless communications (e.g., 5G, 6G, etc.), fiber-optics communication, etc. The terms Alice, Bob, Eve and Charlie, as used herein, represent communication partners, as is well-understood in the art. A quantum channel 170, as used herein, means any known or after-developed communication channel that uses quantum principles to ensure that communications between Bob and Alice remain outside the ability of any eavesdropper (Eve 162) to intercept Alice/Bob communications without being detected. For example, the quantum channel may include a fiber-based optical communications link, a free-space optical communications link (which may include, for example ground-based optical antennae and/or space-based communications satellites), etc. In embodiments described herein, a raw encryption key is determined using known or after-developed QKD techniques in the quantum domain 102 (thus generating a key that remains strictly private to Alice and Bob), and reconciliation (error correction) of the raw encryption key occurs in the public domain 104, as will be described in greater detail below.

Alice 106 (also referred to herein as a "first transceiver system 106") generally includes first quantum transmitter circuitry 110 and first public channel circuitry 112. The first quantum transmitter circuitry 110 is generally configured to generate encoded photons and transmit the encoded photons to Bob 108. The first quantum transmitter circuitry 110 includes laser circuitry 114 to generate light photons (e.g., continuous wave (CW) laser circuitry, etc.) having a fixed frequency and/or amplitude. The first quantum transmitter circuitry 110 also includes polar modulation circuitry 116 that includes amplitude modulation circuitry 118 to modulate the amplitude of the laser light and phase modulation circuitry 120 to modulate a phase of the laser light. Random number generator circuitry 118 is generally configured to provide random encoding for amplitude and phase modulations. Variable optical attenuator (VOA) circuitry 122 attenuates the laser signal down to the quantum level. Band pass filter (BPF) circuitry 124 filters out spectral components outside of the bandwidth of interest. The first quantum transmitter circuitry 110 is generally configured to encode a plurality of photons with amplitude and phase modulation, and transmit encoded photons to Bob 108 over the quantum channel 170, as will be described below.

The first public channel circuitry 112 is generally configured to decrypt messages from Bob 108 over the public channel 160, and perform LDPC decoding to reconcile Bob and Alice keys. The first public channel circuitry 112 includes first information reconciliation circuitry 126 is generally configured to correct errors between keys held by Alice and Bob and to generate a shared secret key, as described below. The first information reconciliation circuitry 126 includes post-quantum decryption circuitry 130 to decrypt messages sent by Bob using a post-quantum cryptography (PQC) protocol. As is well known, PQC protocols are developed with an eye towards future abilities of quantum computers being able to break classical cryptography protocols. Accordingly, several known PQC protocols exists that have been proven (in whole or in part) to be immune from attack using the speed and inherent abilities of quantum computer. Examples of known PCQ protocols include McEliece encryption/decryption protocols, lattice-based encryption/decryption protocols, code-based encryption/decryption protocols, hash-based encryption/decryption protocols, non-commutative encryption/decryption protocols, multivariate encryption/decryption protocols, isogeny encryption/decryption protocols, etc. Indeed, as of the filing of this application, NIST is reviewing several PCQ protocols that may form the basis of future-developed attack-proof encryption. While one example of the present disclosure utilizes the McEliece encryption/decryption protocols, the present disclosure may use any current and/or after-developed PQC protocols. The first information reconciliation circuitry 126 also includes low-density parity check (LDPC) decoding circuitry 128 generally configured to perform forward error correction (FEC) of encrypted messages sent from Bob together with the sifted key available to Alice (after raw key transmission and sifting procedure). By way of example, the LDPC decoding circuitry 128 may perform operations of LDPC code represented in the form of an H-matrix (parity-check matrix), which specifies how parity bits are related to data bits (and such an H-matrix may include quasi-cyclic matrix forms, to facilitate implementation).

Bob 108 (also referred to herein as a "second transceiver system 108") generally includes second quantum transmitter circuitry 138 and second public channel circuitry 136. The second quantum transmitter circuitry 138 is generally configured to generate and receive encoded photons and to receive a raw encryption key transmitted by Alice 106. The second quantum transmitter circuitry 138 includes laser circuitry 140 to generate light photons (e.g., continuous wave (CW) laser circuitry, etc.) having a fixed frequency and/or amplitude. The second quantum transmitter circuitry 138 also includes polar modulation circuitry 142 (that includes amplitude modulation circuitry to modulate the amplitude of the laser light and phase modulation circuitry to modulate a phase of the laser light). Random number generator circuitry 144 is generally configured to provide random encoding of amplitude and phase modulation. VOA circuitry 146 attenuates the laser signal down to the quantum level. Band pass filter (BPF) circuitry 148 filters out spectral components outside of the bandwidth of interest. The second quantum transmitter circuitry 138 is generally configured to encode a plurality of photons with randomly selected amplitude and phase modulation, and send the randomly selected phase and amplitude information to Alice 106 over the quantum channel 170, as will be described below.

The second public channel circuitry 136 is generally configured to encrypt messages for transmission to Alice 106 over the public channel 160. The second public channel circuitry 136 includes key sifting circuitry 148 generally configured to sift raw key data to generate a sifted key. The second public channel circuitry 136 also includes second information reconciliation circuitry 150 generally configured to encode reconciliation information (error correction) with respect to the sifted key to generate a shared secret key, as described below. The second information reconciliation circuitry 150 includes syndrome generation circuitry 152 generally configured to generate error correction parity bits p. In example embodiments described herein, the syndrome (p) may be generated as a product of the sifted key (x) with a parity-check matrix H (i.e., $p=xH^T$) (T denotes a transpose operation), as described in greater detail below. The second information reconciliation circuitry 150 includes PQC encryption circuitry 154, using, for example, the McEliese encryption protocols.

To provide greater operational distance in the quantum domain 102, in some embodiments a Bell state measurement circuitry 132 ("Charlie") may be interposed between Alice 106 and Bob 108, along the quantum channel 170. The Bell state measurement circuitry 132 includes beam splitter (combiner) circuitry 134 generally configured to combine the photons received from Alice and Bob. The Bell state measurement circuitry also includes single photon detectors 133 and 135, denoted as L and R, respectively. The presence of the Bell state measurement circuitry 132 is commonly referred to as measurement device independent (MDI) QKD. Therefore, the Charlie Bell state measurement circuitry 132 serves as a joint quantum receiver for Alice and Bob. Since Alice and Bob's quantum signal get combined by the beam splitter 134 (BS) before the detection takes place, Charlie cannot distinguish Alice and Bob's quantum streams.

QKD Operations

With continued reference to FIG. 1, quantum key distribution (QKD) operations of the circuitry within the quantum domain 102 to generate a raw key are described below. The stabilized CW lasers 114, 140 (low linewidth) are simultaneously used by Alice 106 and Bob 108 to generate global phase stabilized optical pulses (using the unlabeled amplitude modulator circuitry). Using random number generator circuitry 118, 144, Alice and Bob choose the random phases $Ø_A \in [0, 2\pi]$ and $Ø_B \in [0, 2\pi]$, respectively, with corresponding phase modulators (polar modulator circuitry 116, 142). The random phase difference between Alice and Bob are discretized so that:

$$Ø_{A,B} \in \Delta Ø(k_{A,B}) = \left[ \frac{2\pi k_{A,B}}{M}, \frac{2\pi(k_{A,B}+1)}{M} \right] \quad (1)$$

where $k_{A,B} \in \{0, 1, ..., M-1\}$

Alice (Bob) then randomly selects whether to use Z-basis or X-basis. When Z-basis is selected, the phase-randomized coherent state is sent with intensity either μ or 0. When X-basis encoding is selected, Alice and Bob employ corresponding phase and amplitude modulators to randomly select 0 ($\pi/2$) and $\pi C$ ($3\pi/2$) representing logic bits 0 and 1, and such phase-encoded pulses are sent with randomly selected intensities. Charlie 132 performs the Bell state measurements (BSMs) and announces the results to Bob and Alice. A complete BSM represents a projection of any two-photon state to maximally entangled Bell states, defined by:

$$|\psi^{\pm}\rangle = \frac{1}{\sqrt{2}}(|01\rangle \pm |10\rangle), |\phi^{\pm}\rangle = \frac{1}{\sqrt{2}}(|00\rangle \pm |11\rangle). \quad (2)$$

As is well understood in the art, the coincidence detection with a click on SPD R click, and no click on SPD L, indicates the Bell state $|\psi^-\rangle$. In addition, coincidence detection with a click on SPD L, and no click on SPD R, indicates the Bell state $|\psi^+\rangle$.

Alice and Bob then exchange the basis being used via the (authenticated) public channel 160. Alice and Bob then disclose their phase information, that is $k_{A,B}$ and intensities, via public channel 160, and these are used for parameter estimation.

Bob will flip his sequence when Z-basis was used and Charlie identified the Bell states $|\psi^{\pm}\rangle$. Bob will also flip his sequence when X-basis was used and Charlie identified the Bell state $|\psi^-\rangle$. Information related to Z-basis remains confidential to Charlie, and these data are used for raw key.

PQC Information Reconciliation Operations

With continued reference to FIG. 1, Alice and Bob then perform information reconciliation, also known as error correction, based on post-quantum cryptography (PQC). The following disclosure represent a joint cryptosystem example of DV-QKD system, in which reverse reconciliation is employed. "Reverse reconciliation", as used herein, means that Bob is selected as holding the "true" sifted key, which is then reconciled with the other communication partner (Alice). For an example in FIG. 1, assume that Bob 108 holds the "true" sifted key which is then reconciled (error corrected) with Alice 106. The QKD domain 102 is used to generate and transmit the raw key, as described above. With the raw key, the key sifting circuitry 150 generates a sifted key (x) represented those X-Basis and Z-Basis measurement parameters where Bob and Alice measurement bases agree. By performing the comparison on predetermined positions for X-basis bits, Alice and Bob estimate the quantum bit-error rate (QBER).

Syndrome generation circuitry 152 generates an (N, K) LDPC code with parity-check matrix H of size (N−K)×N used to create a syndrome vector $p=xH^T$, where x is the sifted key. In conventional information reconciliation, Bob would transmit the syndrome vector over an (error-free) authenticated public channel to which it is assumed that Eve 162 has access. In contrast, according to the teachings herein, the syndrome vector p is encrypted using PQC encryption circuitry 154. Any PQC scheme can be employed including McEliece encryption, code encryption, and the lattice cryptography Taking McEliece encryption as an example PQC encryption protocol, the adaptive LDPC code can be used for both information reconciliation and PQC-based encryption. By using the PQC algorithms only to protect the transmission of syndrome vector of length N−K, which for high-rate LDPC codes is much shorter than the codeword length n used in PQC, unbreakable security may be achieved. Since only the encrypted syndrome vector p is transmitted by Bob, leakage of information is substantially reduced during error correction. It should be noted that using the quantum domain 102 to perform QKD operations for raw key generation (described above), the presence of an eavesdropper (Eve 162) can be determined using known quantum effects, for instance by monitoring the QBER. By limiting information leakage due to information reconciliation we can significantly extend the transmission distance, as described below with reference to FIGS. 4 and 5.

As an illustration, the secret fraction r for decoy-state-BB84 protocol can be represented as follows:

$$r = q_1^{(Z)}[1 - h_2(e^{(X)})] - q_{\mu}^{(Z)} f_e h_2(e^{(Z)}),$$

where the subscript 1 denotes the single-photon pulses and μ is used to denote the pulse with the mean photon number μ; $q^{(Z)}$ denotes the probability of declaring a successful result ("the gain") when Alice sent a single photon and Bob detected it in the Z-basis, $f_e$ denotes the error correction inefficiency ($f_e \geq 1$); $e^{(X)}$ and $e^{(Z)}$ denote the QBER in the X-basis and Z-basis, respectively; and $h_2(x)$ is a binary entropy function. The second term $q^{(Z)}h_2[e^{(X)}]$ corresponds to the amount of information Eve was able to learn during the raw key transmission. The third term $q^{(Z)}f_e h_2[e^{(Z)}]$ denotes the amount of information reveled during the information reconciliation stage, typically related to the parity-bits transmitted over an authenticated (noiseless) public channel. By transmitting the parity bits using the PQC, with number of parity bits much lower than the number of security bits in PQC, the last term can be eliminated, which results in significant improvement in transmission distance (as described below). This may be particularly true when the second term is numerically close to the first term, which corresponds to the high attenuation regime.

As described above, quantum algorithms to be developed (not yet known), capable of breaking a PQC algorithms will have certain complexity expressed in terms of number of operations L. By ensuring that the number of parity bits N−K is much shorter than the number of secure PQC bits $\log_2 L$, the QKD/PQC system of FIG. 1 and described herein will be deemed secure. Alternatively, the PQC subsystem can be replaced by any private cryptography scheme.

As a general matter, to facilitate hardware implementation the McEliece PQC protocols may be based on quasi cyclic (QC)-LDPC coding. In some embodiments, LDPC encoders and decoders may be implemented in field-programmable gate array (FPGA) circuitry, and thus the system depicted in FIG. 1 represents an excellent candidate to use for transmission of parity bits in the described hybrid QKD-PQC scheme. In particular, rate-adaptive spatially coupled LDPC code derived from template QC-LDPC code, is very flexible for use in both information reconciliation and McEliece cryptosystem to encrypt the parity bits. The starting point is the QC-LPDC code with the template parity-check matrix:

$$H_{QC} = \begin{bmatrix} I & I & I & \ldots & I \\ p^{S[0]} & p^{S[1]} & p^{S[2]} & \ldots & p^{S[c-1]} \\ p^{2S[0]} & p^{2S[1]} & p^{2S[2]} & \ldots & p^{2S[c-1]} \\ \ldots & \ldots & \ldots & \ldots & \ldots \\ p^{(r-1)S[1]} & p^{(r-1)S[1]} & p^{(r-1)S[2]} & \ldots & p^{(r-1)S[c-1]} \end{bmatrix}, \quad (3)$$

where I and P are identity and permutation matrices of size b×b, and integers $S[i] \in \{0, 1, \ldots, b-1\}$ (i=0, 1, ..., r−1; r<b) are chosen, for example, to satisfy the girth (the largest cycle in corresponding bipartite graph representation of $H_{QC}$) constrains. Multiple LDPC codes, being referred here as subcodes, are incorporated into the design.

As an illustration, the column-weight-3 code of girth-10 can be designed to be a subcode of girth-8, column weight-4 code. Lower-rate code of the same girth should be a subcode of higher-rate code. This architecture allows run-time reconfiguration on a codeword-by-codeword basis. Finer granulation in code rate adaption can be implemented by shortening the template parity-check matrix (3) (by reducing the number of block-columns). In some embodiments, a plurality of sets of integers (S[i]) may be generated that satisfy run-time configurability conditions, which may be selected at random.

Figure 2:
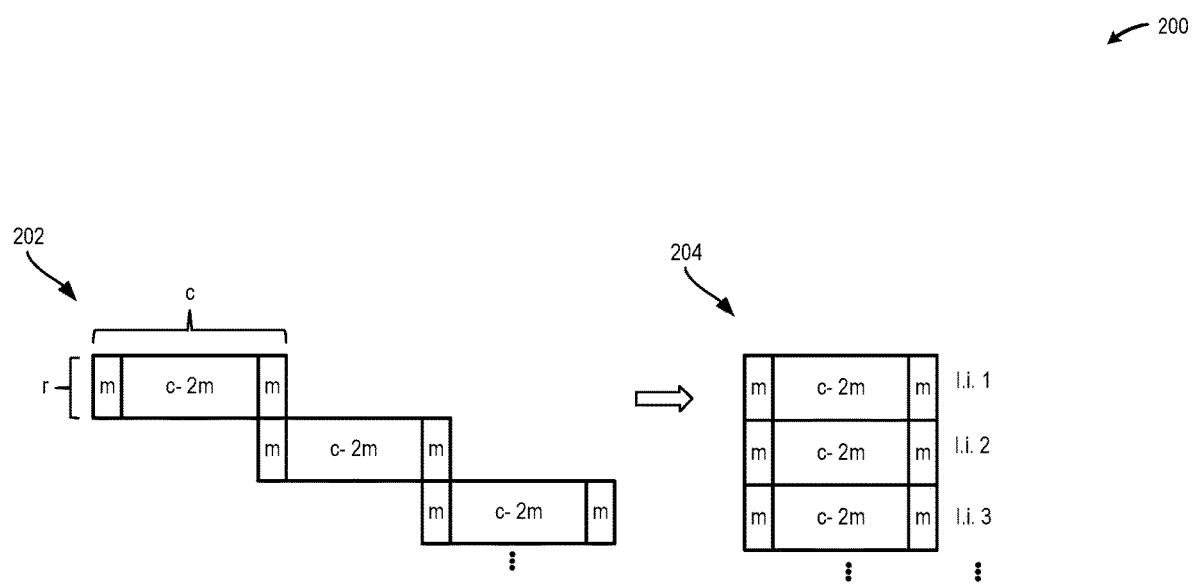
FIG. 2 illustrates a spatially coupled (SC)-LDPC code design derived from a QC-LDPC code template 200 according to one embodiment of the present disclosure.

FIG. 2 illustrates a spatially coupled (SC)-LDPC code design derived from a QC-LDPC code template 200 according to one embodiment of the present disclosure. By using this QC-LDPC code as a template design, spatially coupled (SC)-LDPC code is generated, as illustrated at 202. The codeword length of this SC-LDPC code will be given by: b×(lxc−m×(l−1)); where l is the number of coupled template QC-LDPC codes and m is the coupling length expressed in terms of number blocks. Because there are r×c×l non-empty submatrices in the parity-check matrix of the SC-LDPC code, a layer index (l.i.) is introduced here to reduce the memory requirements, at 204. Accordingly, memory requirements may be reduced since the all-zeros submatrices are removed. In other words, since the configuration of the parity-check matrix 202 is known, it is not necessary to store all-zeros submatrices, rather storing the l.i. is all that is needed. For a full-rank parity-check matric of the template QC-LDPC code, the code rate of SC-LDPC code will therefore be:

$$R = 1 - (rl/(lc - m(l-1)))$$

Therefore, for fixed 1, by increasing the coupling length m we can reduce the code rate and thus improve the error correction capability of the code. To adjust for error correction strength, depending on the time-varying channel conditions, the template QC-LDPC code and parameters of corresponding SC-LDPC code may be adjusted. For application using McEliece protocols, in some embodiments, parameters of both QC- and SC-LDPC codes may be randomly selected.

In reverse reconciliation, based on channel conditions Bob selects the block-columns in template QC-LDPC code, coupling length for spatially coupled (SC)-LDPC coding design, and the number of spatially coupling blocks, and provides the details of the spatially coupling (N,K) LDPC code design to Alice. Bob further encodes the information bits x obtained during sifting procedure by employing the selected spatially coupling LDPC code to get the parity bits p. Alice may then randomly choose the number of block-columns in template parity-check matrix of corresponding QC-LDPC code, the coupling length m, and number of QC-LDPC codes to be used in SC-LDPC-based McEliece encryption scheme. Alice generates the SC generator matrix G, and publishes the public key G' determined by $$G' = S^{-1}GP'^{-1}$$

where S is the non-singular scrambling matrix; and P' is the permutation matrix (different from one in Eqn. (3)).

Bob then encodes the parity bits p as follows:

$$x = pG' + e \quad (5)$$

where e is the error pattern of low weight (e.g., number of nonzero locations)

Upon receiving x Alice will perform the following transformation:

$$x' = xP' = pS^{-1}G + eP' \quad (6)$$

Alice follows by the LDPC decoding based on the parity-check matrix to obtain:

$$p' = pS^{-1} \quad (7)$$

Alice then recovers p by multiplication of p' by S. Alice will further use these parity bits p together with her sifted key to perform the LDPC decoding, and after decoding the errors introduced by either quantum channel (during raw key transmission) or Eve are corrected for. The resulting key after information reconciliation is used as the corrected key. Privacy amplification may be further performed to distill from the corrected key a smaller set of bits whose correlation with Eve's string falls below the desired threshold, through the use of the universal hash functions, which is well known concept in cryptography. The resulting key after the privacy amplification is used as the secure key. Assuming that Eve employs the quantum information set decoding (QISD)

attack, the number of parity bits N−K to be encrypted by (n,k) LDPC coding based McEliece encryption scheme should not be larger than:

$$\log_2\{n^2[C(n,k)/(0.29C(n-t,k))]^{1/2}\} \quad (8)$$

where: C(n,k) denotes the n choose k operation;
t denotes maximum number of errors that can be corrected by the LDPC code use in McEliece encryption scheme.

For high-rate QC- and spatially coupled LDPC codes used in information reconciliation this condition is much less stringent compared to using McEliece encryption to protect the information sequence instead. In particular when N−K<<k we can randomly embed the parity-bits so that Eve needs to apply the brute-force approach to determine the positions of the parity-bits. Of course, it should be noted that the operations described above contributable to Alice may be performed by Bob, and the operations attributable to Bob may be performed by Alice.

Figure 3:
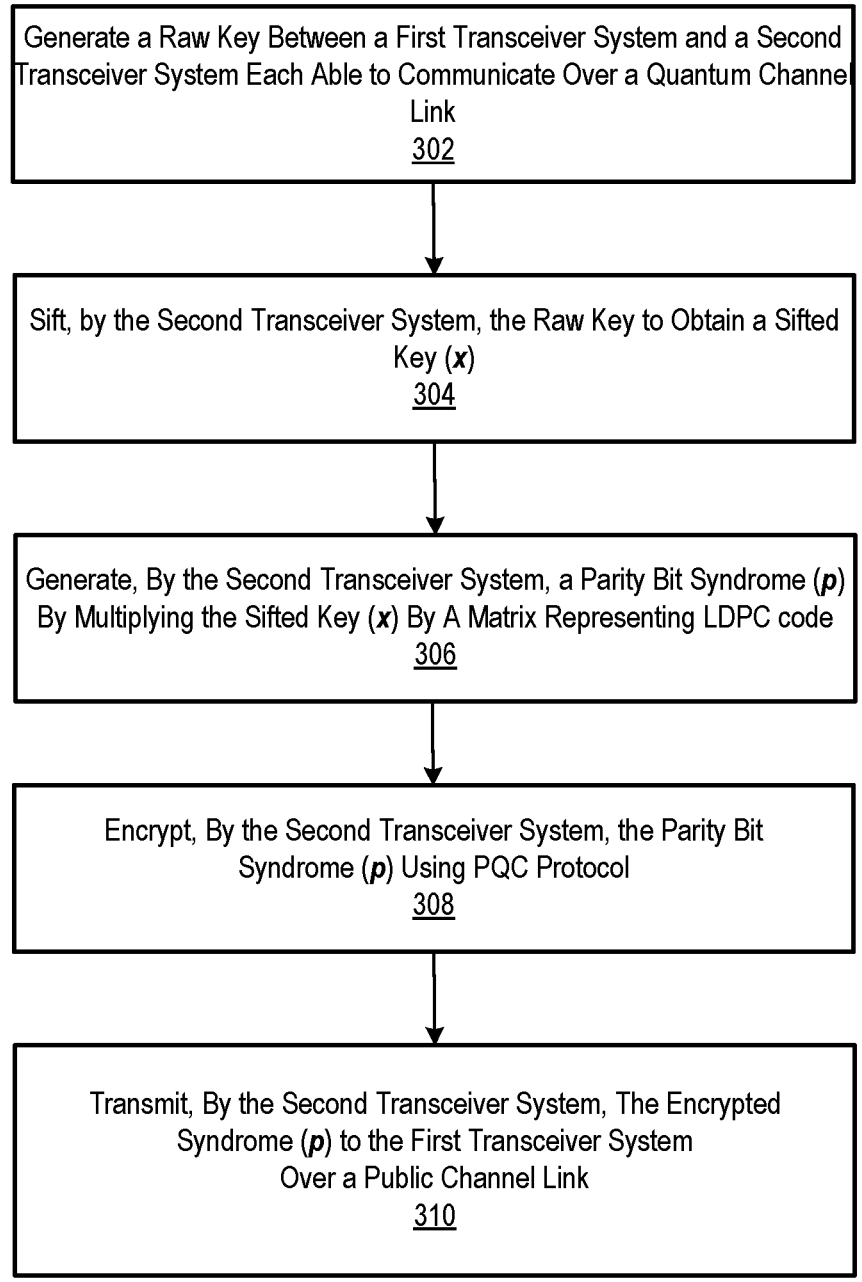
FIG. 3 illustrates a flowchart of joint QKD-PQC operations according to one embodiment of the present disclosure.

FIG. 3 illustrates a flowchart 300 of joint QKD-PQC operations according to one embodiment of the present disclosure. Operations of this embodiment include generating a raw key between a first communications system and a second communications system communicating over a quantum channel link, the raw key being generated using a quantum key distribution (QKD) technique 302. Operations of this embodiment also include sifting, by the first communications system, the raw key to obtain a sifted key (x) 304. Operations also include generating, by the first communications system, a parity bits matrix syndrome (p) by multiplying the sifted key x by a matrix representing low density parity check (LDPC) code (p=xH) 306. Operations also include encrypting, by the first communications system, the syndrome (p) using a post-quantum cryptography (PQC) protocol 308. Operations also include transmitting, by the first communications system, the encrypted syndrome (p) to the second communications system over a public channel link 310.

While FIG. 3 illustrates various operations according to one embodiment, it is to be understood that not all of the operations depicted in FIG. 3 are necessary for other embodiments. Indeed, it is fully contemplated herein that in other embodiments of the present disclosure, the operations depicted in FIG. 3, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

Experimental Results

Figure 4:
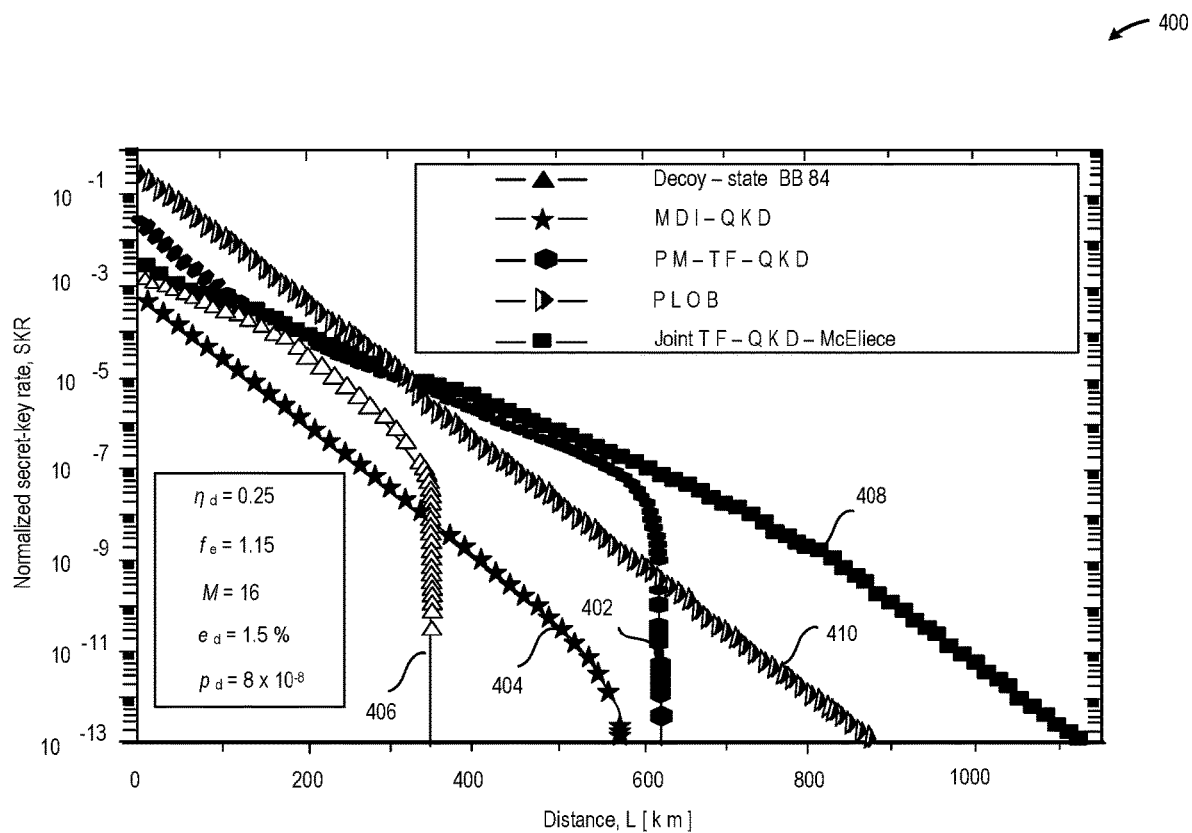
FIG. 4 illustrates a plot of SKR vs. distance for the joint QKD-PQC (McEliece) encryption schemes described herein that is under QISD attack from a decoy-state, an MDI-QKD, and a PM-TF-QKD.

FIG. 4 illustrates a plot 400 of SKR vs. distance for the joint QKD-PQC (McEliece) encryption schemes described herein that is under QISD attack from a decoy-state, an MDI-QKD, and a PM-TF-QKD.

FIG. 4 compares the TF-QKD-McEliece encryption scheme described herein (plot 408) against the phase-matching (PM) TF-QKD protocol (plot 402), the MDI-QKD protocol (plot 404), and decoy-state-based BB84 protocol (plot 406). The system parameters are selected as follows: the detector efficiency $\eta_d$=0.25, reconciliation inefficiency $f_e$=1.15, the dark count rate $p_d$=8×10⁻⁸, misalignment error $e_d$=1.5%, and the number of phase slices for PM TF-QKD is set to M=16. Regarding the transmission medium, it is assumed that recently reported ultra-low-loss fiber of attenuation 0.1419 dB/km (at 1560 nm) is used. Also in FIG. 4, a Pirandola-Laurenza-Ottaviani-Banchi (PLOB) (plot 410) that is bound on a linear key rate is provided. Both PM TF-QKD and joint TF-QKD-McEliece encryption schemes outperform the decoy-state BB84 protocol for distances larger than 162 km, while simultaneously outperforming MDI-QKD protocol for all distances, and exceed the PLOB bound at distance of 322 km. The PM TF-QKD protocol can achieve the maximum distance of 623 km. The joint TF-QKD McEliece encryption scheme of the present disclosure, under QISD attack, is able to achieve the distance of at least 1127 km, thus significantly outperforming all other schemes. In some embodiments, SKR may be further improved by employing multiple photon degrees of freedom including polarization, wavelength, OAM, and spatial modes, etc.

Figure 5:
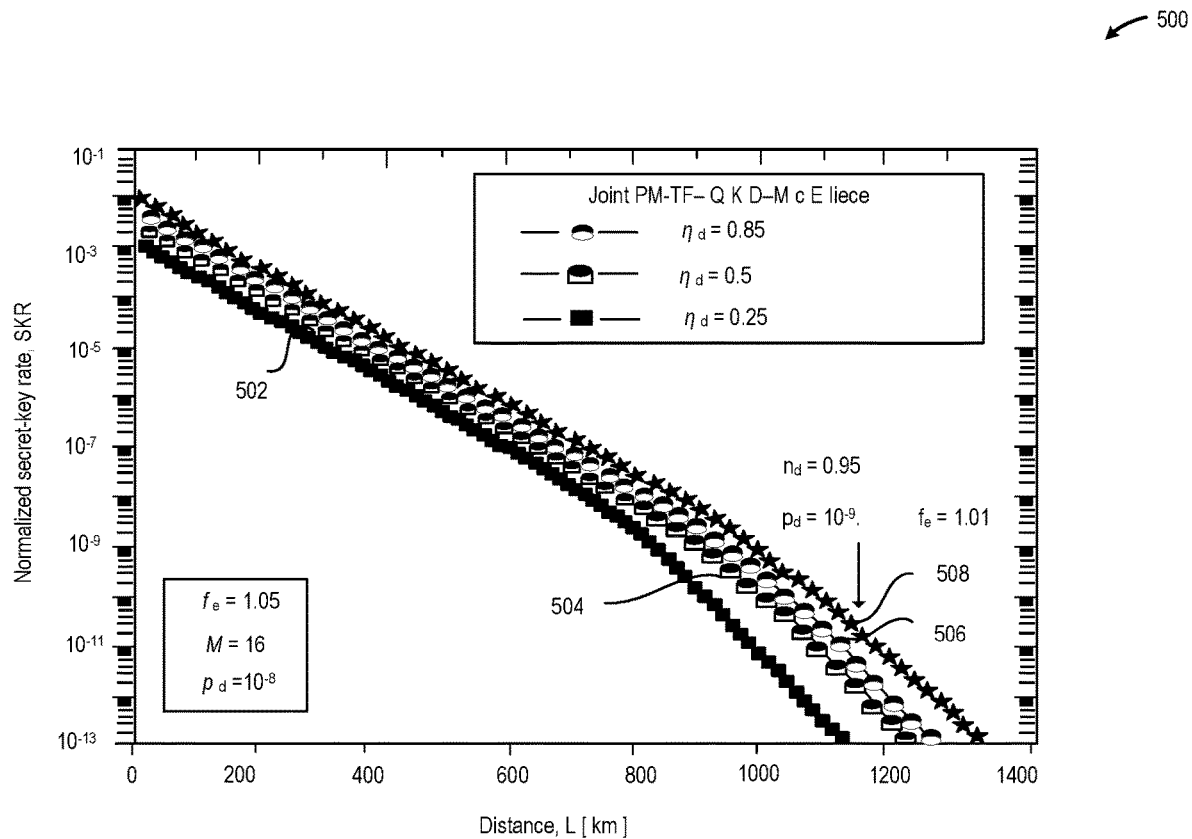
FIG. 5 illustrates a plot of transmission distances using the QKD/PQC schemes described herein, for different detector efficiency values.

FIG. 5 illustrates a plot 500 of transmission distances using the QKD/PQC schemes described herein, for different detector efficiency values. In particular, the plots of FIG. 5 illustrates SKR vs. transmission distance of a joint MP-TF-QKD-McEliece cryptosystem, under QISD attack, for different detector efficiencies, namely: $\eta_d$=0.25 (plot 502), $\eta_d$=0.5 (plot 504), $\eta_d$=0.85 (plot 506), and $\eta_d$=0.95 (plot 508), and assuming M=16, $f_e$=1.05, and $p_d$=10⁻⁸. As can be seen, for detector efficiency 0.5 the transmission distance can be extended to 1238 km. For almost ideal system parameters ($\eta_d$=0.95, $f_e$=1.01, and $p_d$=10⁻⁹), the maximum possible transmission distance for normalized SKR of 10⁻¹³ is 1355 km.

Thus, the present disclosure is directed to systems and methods of providing a secure quantum key distribution cryptosystem in which the quantum key data is exchanged between Alice and Bob using a quantum channel and the parity bits associated with the quantum key data are encrypted using a post-quantum computing (PQC) encryption method and communicated between Alice and Bob using a public channel.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" may refer to, for example, software, firmware and/or circuitry configured to perform any of the aforementioned operations. Software may be embodied as a software package, code, instructions, instruction sets and/or data recorded on non-transitory, computer-readable storage devices. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as processors comprising one or more individual instruction processing cores, state machine circuitry, and/or firmware that stores instructions executed by programmable circuitry and/or future computing circuitry including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc.

Any of the operations described herein may be implemented in a system that includes one or more non-transitory storage devices having stored therein, individually or in combination, instructions that when executed by circuitry perform the operations. Here, the circuitry may include any of the aforementioned circuitry including, for examples, one or more processors, ASICs, ICs, etc., and/or other programmable circuitry. Also, it is intended that operations described herein may be distributed across a plurality of physical devices, such as processing structures at more than one different physical location. The storage device includes any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed is:

1. A quantum communications system, comprising:
   a quantum domain comprising a first quantum transmitter circuitry and a second quantum transmitter circuitry to communicate over a quantum channel link; the first quantum transmitter circuitry and the second quantum transmitter circuitry to generate a raw encryption key using quantum communications via the quantum channel link;
   a public domain comprising first public channel circuitry and second public channel circuitry to communicate over a public channel link; the second public channel circuitry to generate a sifted key based on the raw key, and to generate a parity bits syndrome vector with respect to the sifted key; the second public channel circuitry further to encrypt the syndrome vector and transmit the encrypted syndrome vector, over the public channel link to the first public channel circuitry, to enable the first public channel circuitry to determine a corrected key that is based on the sifted key; wherein the first public channel circuitry further to decrypt the encrypted syndrome vector and wherein the first public channel circuitry includes low-density parity check (LDPC) code to decode the decrypted syndrome vector and generate the corrected key.

2. The system of claim 1, wherein the first public channel circuitry to encrypt the syndrome vector using a post-quantum cryptography (PQC) protocol.

3. The system of claim 2, wherein the PQC protocol comprises a McEliece PQC protocol.

4. The system of claim 1, wherein the second public channel circuitry includes syndrome generation circuitry to generate the syndrome vector my multiplying the sifted key by a parity-check matrix H representing low-density parity check (LDPC) code.

5. The system of claim 1, wherein the second public channel circuitry also to reduce a size the syndrome vector by removing all-zero submatrices within the syndrome vector.

6. The system of claim 1, further comprising Bell state measurement circuitry disposed between the first quantum channel circuitry and a second quantum channel circuitry along the quantum channel link, the Bell state measurement circuitry to determine Bell state measurements regarding quantum communications between the first quantum channel circuitry and a second quantum channel circuitry.

7. A method to reduce information leakage between two link partners, using a joint quantum key distribution (QKD) and post-quantum cryptography (PQC) system, the method comprising:
   generating a raw key between a first transceiver system and a second transceiver system communicating over a quantum channel link, the raw key being generated using a quantum key distribution (QKD) technique;
   sifting, by the first and second transceiver systems, the raw key to obtain a sifted key (x);
   generating, by the second transceiver system, a parity bits syndrome vector (p) by multiplying the sifted key x by a parity-check matrix H representing low-density parity check (LDPC) code;
   encrypting, by the second transceiver system, the syndrome (p) using a post-quantum cryptography (PQC) protocol;
   transmitting, by the second transceiver system, the encrypted syndrome (p) to the first transceiver system over a public channel link;
   decrypting, by first transceiver system, the encrypted syndrome vector using the PQC protocol; and
   decoding, by first transceiver system, using low density parity check (LDPC) circuitry, performed on the decrypted syndrome vector and sifted key to generate a corrected key.

8. The method of claim 7, wherein the PQC protocol comprises a McEliece PQC protocol.

9. The method of claim 7, further comprising reducing a size of the parity-check matrix of corresponding spatially coupled LDPC code by introducing the layer index so that all-zero submatrices are removed.

10. The method of claim 7, further comprising determining, by Bell state measurement circuitry disposed between the first transceiver system and the second transceiver system along the quantum channel link, Bell state measurements regarding quantum communications between first transceiver system and the second transceiver system.

11. At least one non-transitory storage device that includes machine-readable instructions that, when executed by one or more processors, cause the one or more processors to perform operations, comprising:
- generate a raw key between Alice and Bob communicating over a quantum channel link, the raw key being generated using a quantum key distribution (QKD) technique;
- generate a raw key between a first transceiver system and a second transceiver system communicating over a quantum channel link, the raw key being generated using a quantum key distribution (QKD) technique;
- sift, by the first and second transceiver systems, the raw key to obtain a sifted key (x);
- generate, by the second transceiver system, a parity bits syndrome vector (p) by multiplying the sifted key x by a parity-check matrix H representing low-density parity check (LDPC) code;
- encrypt, by the second transceiver system, the syndrome (p) using a post-quantum cryptography (PQC) protocol;
- transmit, by the second transceiver system, the encrypted syndrome (p) to the first transceiver system over a public channel link;
- decrypt, by first transceiver system, the encrypted syndrome vector using the PQC protocol; and
- decode, by the first transceiver system Alice decoder using low-density parity check (LDPC) decoding circuitry, the decrypted syndrome vector and the sifted key to generate a corrected key.

12. The at least one non-transitory storage device of claim 11, wherein the PQC protocol comprises a McEliece PQC protocol.

13. The at least one non-transitory storage device of claim 11, wherein the machine-readable instructions that, when executed by one or more processors, cause the one or more processors to perform operations, comprising:
- reduce a size the syndrome vector by removing all-zero submatrices within the syndrome vector.

14. The at least one non-transitory storage device of claim 11, wherein the machine-readable instructions that, when executed by one or more processors, cause the one or more processors to perform operations, comprising:
- determining Bell state measurements regarding quantum communications between the first and second transceiver systems.

15. The system of claim 1, wherein the second public channel circuitry further to encrypt the syndrome vector using a private cryptosystem protocol.

* * * * *